Dec. 1, 1964    A. A. A. FEUILLASTRE    3,159,044
GEOMETRICALLY PROGRESSIVE GEAR BOX
Filed Jan. 4, 1961    4 Sheets-Sheet 1

United States Patent Office 3,159,044
Patented Dec. 1, 1964

3,159,044
GEOMETRICALLY PROGRESSIVE GEAR BOX
Auguste André Alexandre Feuillastre, 159 Rue Nationale,
Paris, France
Filed Jan. 4, 1961, Ser. No. 80,622
Claims priority, application France, Feb. 3, 1960,
817,471, Patent 1,248,245
4 Claims. (Cl. 74—342)

Gear boxes known at present and whose speed ratio is calculated according to the Renard rate of advancement, are calculated form well defined speeds.

These speed calculations have to be worked out for each speed, which, when a gear box is required to have a very extended range of speeds requires construction of a gear box by known constructions having a great deal of space requirement and hence results in a very large unit.

Other disadvantages are present in conventional gear boxes where the speeds are obtained by means of change gear ratios accomplished manually.

A principal object of the present invention is to obviate these disadvantages.

One of the objects of the present invention is to provide a multi-speed gear box possessing geometrically progressive gear ratios with a large range of ratios. The ratios of this range are constructed for increasing and decreasing with standard pinions and gears.

Another object of the invention is to provide a gear box with a single ratio between individual driving pinions and the corresponding driven gears.

Another object of the invention is to provide a gear box constructable at a low cost.

Another object of the invention is to provide a gear box in which the output shaft revolves in the same direction as the driving or input shaft.

Still another object of the invention is to provide a gear box occupying only a small space.

Another object of the invention is to produce a gear box in which four shafts comprising driving, output, intermediate and auxiliary shafts form a geometrical figure such as a square, a rectangle or other quadrilaterals.

Other objects and advantages will be understood from the following description and the attached drawing, in which.

Figure 1:
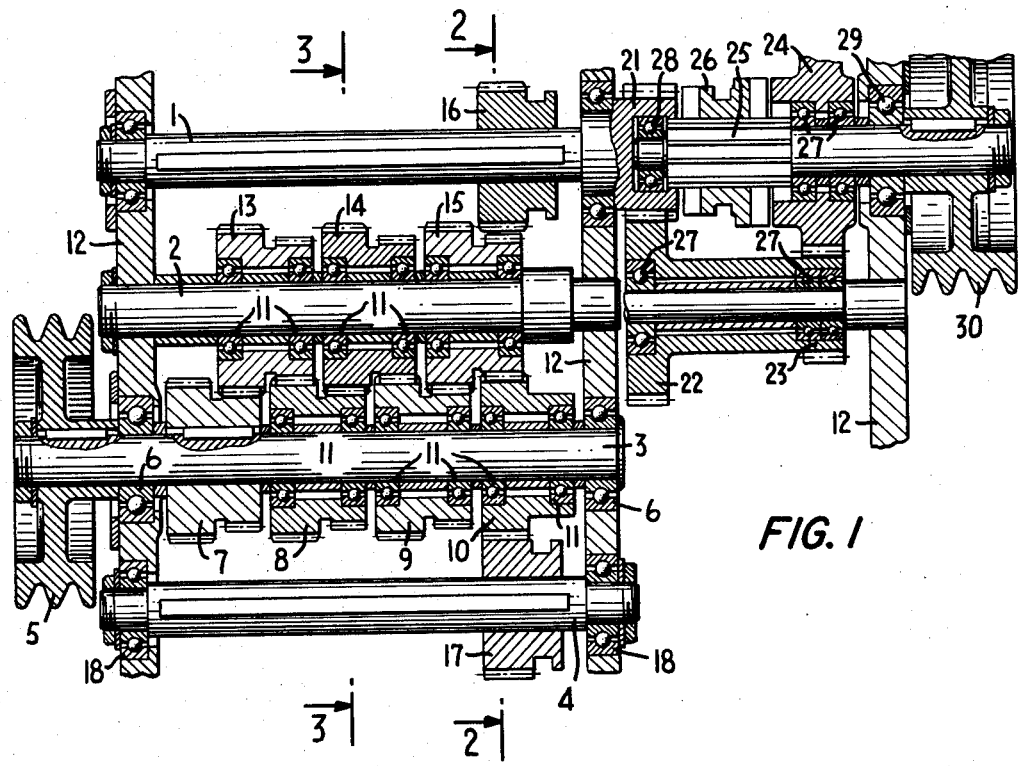
FIG. 1 is a developed view of a seven-speed gear box with a geometrical progression of speeds, and provided with a gear arrangement allowing two sets of gear combinations or speeds.
Figure 2:
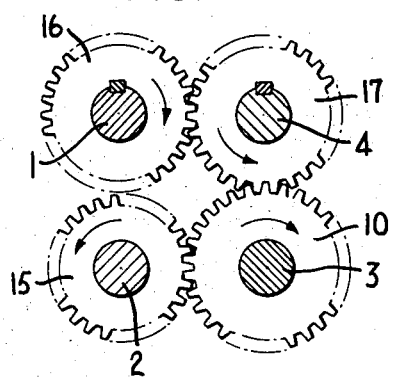
FIG. 2 is a sectional view along line 2—2 of FIG. 1.
Figure 3:
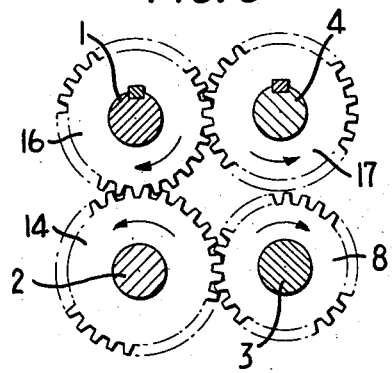
FIG. 3 is a sectional view taken along line 3—3 of FIG. 1.

The gear box shown in FIGS. 1 to 3 consists essentially of a driving shaft or input shaft 3 mounted on bearings 6 and directly controlled by an engine, not shown, by means, for example, of a belt driving a pulley 5. On this shaft is keyed a pair of integral gear 7.

Other pairs of gears 8, 9 and 10 similar to the gear pair of are mounted loosely revolving on the input shaft 3 after the pair 7 so that there is successively a driving gear of larger diameter and a driven pinion of a smaller diameter.

In each pair of integral gears the difference in diameter between the smaller pinion and the larger gear may be very little, so that there is a little difference in the number of teeth, allowing a minimal ratio of transmission. In order to facilitate the rotation of the pairs 8, 9 and 10 revolving freely on the shaft 3, these gear pairs are each mounted on balls or bearings 11.

A counter shaft 2, parallel with the driving shaft 3 is fixed on the transmission housing 12. On this shaft are mounted, freely revolving on ball-bearings 11 other pairs of integral gears 13, 14, 15 similar to the gear pairs 7, 8, 9 and 10 which are mounted on the driving shaft 3.

Movement is transmitted successively from the driving pinion of pair 7 to the driven gear of pair 13 the driving pinion of pair 13 controlling the driven gear of pair 8 and so on, up to the drive gear 10. In such a transmission, all the driving pinions have the same number of teeth and it is the same for the driven gear. This enables a speed ratio between driving and driven gears which is identical and results in a speed range whose geometrical progression has an increasing ratio of driving pinion on driven gear or a decreasing ratio of driven pinion on driving gear.

The speeds obtained in geometrical progression are transmitted to an output shaft 1 by means of sliding gears 16 and 17. FIG. 1 shows that the pinion 16 is keyed slidably on the output shaft 1. It receives its movement from one of the larger gears of the pairs 13, 14 and 15 and rotates in the same direction as the input shaft 3.

The gear 17 is slidably mounted on an auxiliary shaft 4 which rotates freely in the housing of the gear box on ball-bearings 18. This gear 17 receives its movement from the gears of greater size of the pairs 7, 8, 9 and 10 mounted on the input shaft 3 and imparts this movement to the output gear 16 which rotates in the same direction as the input shaft 3. The two pinions 16 and 17 are permanently meshed together and they are simultaneously axially shifted by means of a controlling fork, not shown, which is engaged in their respective grooves.

With the position of the gears as in FIG. 2 the gear 16 which faces the driving pinion of pair 15 is not meshed. The movement is transmitted from shaft 3 to shaft 1 through the driven gear 10. Assuming a number of teeth of $n^1$ for the larger driven gear and $n^2$ for the smaller driving pinion, the speed at the output will be $V'$ $$\left(\frac{n^2}{n^1}\right)^0$$

where V' is the input speed.

With another position (FIG. 3) of the sliding gears i.e. as in the sectional view along line 3—3 of FIG. 1, the gear 16 which faces the driven pinion of pair 4 is meshed, but the gear 17 which is aligned with the driving pinion of pair 8 is not meshed, so that the transmission takes place from shaft 3 to shaft 1 through the driven pinion of pair 14 and the speed will be $$V'x\left(\frac{N^2}{n^1}\right)^3$$

The seven positions of the sliding gears 16 and 17 provide then seven different speeds whose ratio is equal to $$\frac{n^2}{n^1}$$

at the power 1, 2, 3 up to 6, i.e. in a geometrical ratio.

In the gear box described above, the geometrical progression can be an increasing progression if we start from the minimal speed that must be obtained or decreasing if we start from the speed of the engine, i.e. the input speed of the box. The progression ratio may be necessitated by the divergence in percentage required by working conditions. In both of the above-mentioned cases the number of speeds is determined when the minimum or maximum limit speed is attained.

We must also take into account the gear ratio which is nearest to the ratio, this ratio being necessitated by construction conditions.

The problem arises as follows:
By taking $n^2$ to be the small pinion and $n^1$ the large one, the ratio Z will be:

$$\frac{n^2}{n^1} = Z \text{ (decreasing ratio)}$$

$$\frac{n^1}{n^2} = Z \text{ (increasing ratio)}$$

In the case where the computation takes place from given speeds between a maximum and a minimum, we must determine the ratio.

The problem thus arises as follows:
$V^1$ the maximum speed,
$V^2$ the minimum speed,
$N$ the speed number
$Z$ the ratio
we have:

$$\frac{V^1}{V^2} = Z^{N-1}$$

Thus, for making the seven-speed gear box already described above, we have:
$V$=maximum speed
$Z$=ratio
$n^2$=small pinion
$n^1$=large pinion
and we have:

$$\frac{n^2}{n^1} = Z$$

hence the following speed computation:
1st speed=$V$
2nd speed=$V \times Z$
3rd speed=$V \times Z^2$
4th speed=$V \times Z^3$
etc. . . . up to the 7th speed=$V \times Z^6$
or else:
1st speed=$V$ 2nd speed=$V \times \left(\frac{n^2}{n^1}\right)$ 3rd speed=$V \times \left(\frac{n^2}{n^1}\right)^2$ 4th speed=$V \times \left(\frac{n^2}{n^1}\right)^3$ etc . . . up to the 7th speed=$V \times \left(\frac{n^2}{n^1}\right)^6$ This assembly thus devised works alone or only forms a first unit or set of combinations.

The gear box of FIG. 1 is provided with a system of gears which gives a second set of speeds coming after those obtained from the gear box itself. A gear 21 keyed on the shaft 1 imparts its movement to the pulley 30 keyed on the shaft 25 having a splined portion upon which slides a coupling or clutch member 26, the assembly being freely revolving on ball-bearings 28 and 29.

The coupling member 26 is engageable with the gear 21 and when engaged with the gear 21 transmits directly the speeds of the gear box and the integral gears 22 and 23 and the gear 24 which rotate freely on the ball bearings 27 transmit as later explained to the pulley 30 a second range of speeds beyond the first range.

The same member 26 when engaged with the gear 24 transmits the speeds of the box with a gear ratio $$\frac{21}{22} \times \frac{23}{24}$$

which is equal to the overall ratio of the gear box. The number of speeds is then doubled.

The gear box shown in the FIGURES 4, 5, 6, 7 has parts thereof similar to the parts of the first-described similarly numbered for ease of understanding and comparing the embodiments of the invention and comprises a succession of one pair of gears 7 which is keyed and other pairs 8, 9 and 10 which are mounted freely on the input shaft 3, which receives its movement from an engine, not shown. The movement is transmitted to an output shaft 1 through a counter-shaft 2 or an auxiliary shaft 4. The first pair of gears 7, comprising a driven gear of larger diameter with a number $n^1$ of teeth and a driving pinion of smaller diameter with a number $n^2$ of teeth is keyed on the input shaft 3 and drives, through its driving pinion, the driven gear of the pair 13 which rotates freely on the counter shaft 2.

The driving pinion of pair 13 drives the driven gear of pair 8 which rotates freely on the input shaft 3 after the keyed pair 7. The movement is transmitted successively from one pair to another and alternatively on the input shaft 3 and on the countershaft 2 up to a gear pair 10.

Figure 4:
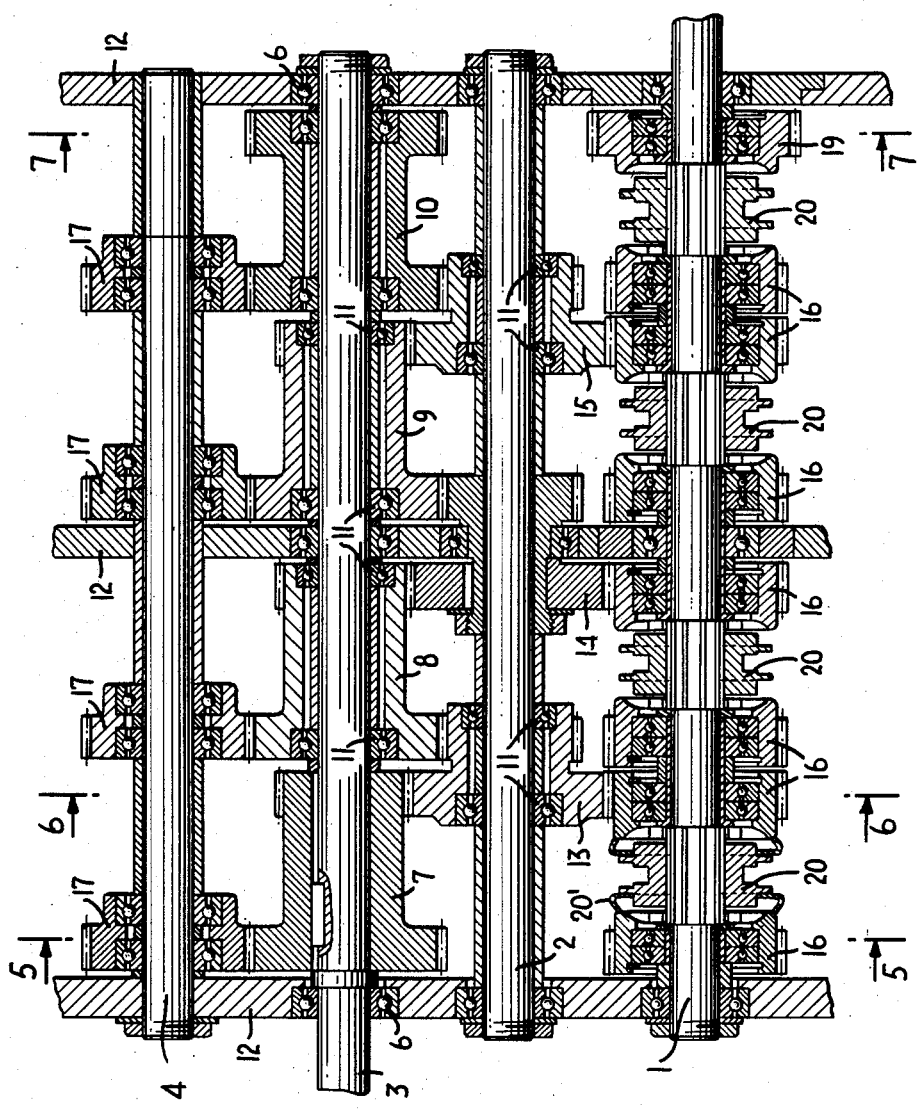
FIG. 4 is a sectional view of a gear box according to the invention and operable in reverse directions.
Figure 5:
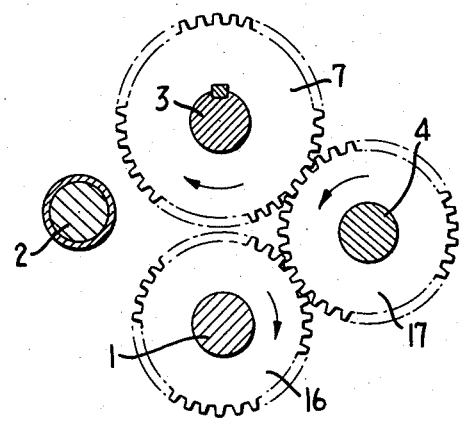
FIG. 5 is a sectional view along line 5—5 of FIG. 4.

The speeds are transmitted by the driven gears of pairs 7, 8, 9 and 10 mounted on the input shaft 3, to four gears 16 freely mounted on an output shaft 1, through four gears 17 which are freely mounted on a countershaft 4. The output shaft 1 rotates in the same direction as the input shaft 3 (FIG. 5 which is a sectional view 2—2 of FIG. 4).

Other speeds are transmitted by the driven gears of pairs 13, 14, 15 mounted on the countershaft 2, to three other gears 16, freely mounted on the output shaft 1. This shaft rotates in the same direction as the input shaft 3 (FIG. 6 which is a section along line 3—3 of FIG. 4).

A speed in a reverse direction is obtained on the gear 19 of larger diameter than the gears 16 and which rotates freely on the output shaft 1. This gear 19 meshes directly with the driving pinion of the pair 10 mounted on the input shaft 3 (FIG. 7 which is a section taken along line 7—7 of FIG. 4).

The chosen speed is obtained by sliding one of a plurality of coupling or clutch members 20, which, when it is shifted axially, connects one of the gears 16 or the gear 19 with the output shaft 1.

Synchronizing means 20' is provided on each of the members 20 for reducing the speed of rotation of the gears 16 or 19 with regard to the output shaft 1.

The assembly of the gear box is contained in a housing with which the sides 12 supporting all the shafts are integral. This construction or gear box permits obtaining seven forward speeds and one reverse speed. But this example is not limited and it is possible to obtain, by increasing or decreasing the number of gears any number of speeds always in a geometrical progression of increasing or decreasing speeds.

This box may be employed on a motor vehicle since it contains at least one reverse speed.

Figure 6:
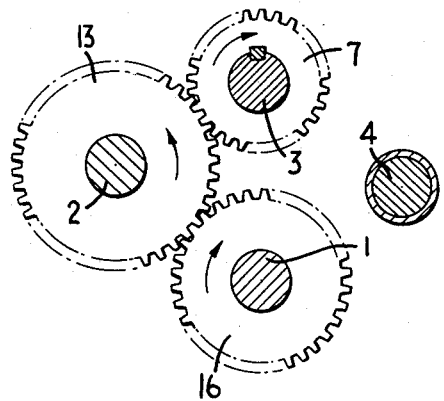
FIG. 6 is a sectional view taken along line 6—6 of FIG. 4.

In FIGS. 5 and 6 the gear shafts, which generally are disposed in a geometrical figure as a square, are here in a diamond shaped disposition. The sides of the diamond formed by the four shafts of FIGS. 5 and 6 remain the same. Only the diagonal lines are changed in order to closer space the input 3 and the output shaft 1. This is to permit the direct meshing of the reverse speed. The last driving gear of pair 10 and the gear 19 may have any ratio chosen independently of the geometrical progression.

Figure 7:
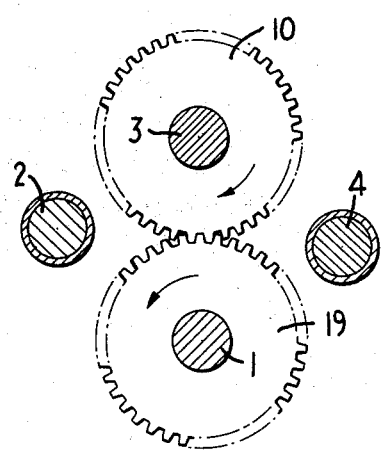
FIG. 7 is a sectional view taken along line 7—7 of FIG. 4 showing the constant meshing of the reverse gearing one the driving shaft.

In the gear box with a range of many gear combinations of FIG. 7, a second range of combinations is possible which has a ratio which is equal to the ratio of the first range raised to the power $P=N^1$ (number of speeds of this first range). The speeds of the first range are inserted in each speed of the second unit that gives a total number of speeds of $N^1$ (first range) $\times N^2$ (second range)

Figure 8:
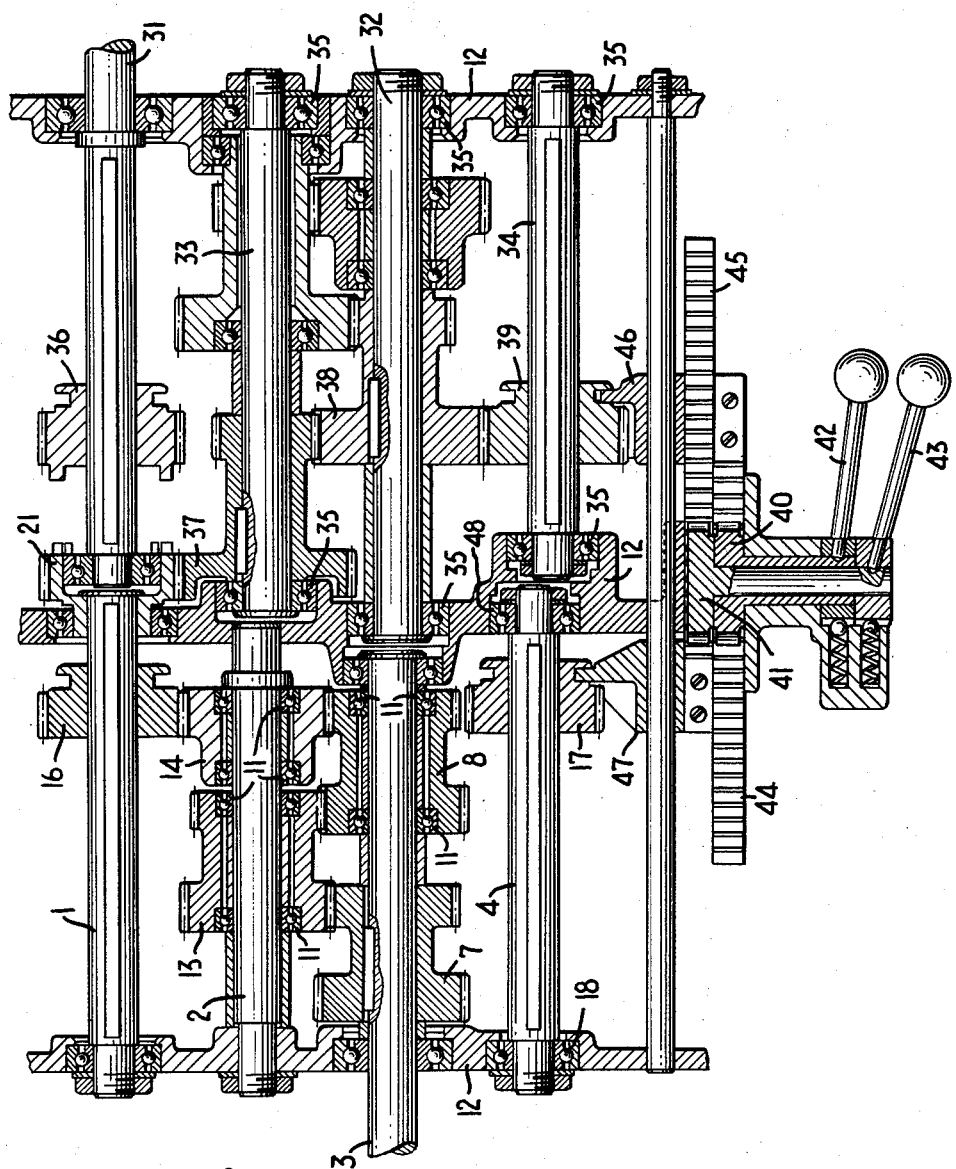
FIG. 8 is a sectional view of a gear box with two stages or geometric progressions in series of four speeds each from which sixteen speeds are obtainable.

Such a gear box is shown in FIG. 8 and comprises two geometric progressions in series or arrangements of gear combinations with four speeds for each and provides in total $4 \times 4'' \ 16$ speeds.

In this case, the ratio of the second speeds is equal to the ratio of the first speeds $$\frac{n^2}{N^1}$$

raised to the power 4, i.e.

$$\left(\frac{n^2}{n^1}\right)^4$$

Each of the gear combinations or units as described above with respect to FIG. 1, comprises a plurality of pairs of two integral gears 7 keyed on and a gear pair 8 freely rotated on an input shaft 3 which receives its turning effort from an engine. In this embodiment the reference designations employed in FIG. 1 are applied to similar parts.

The turning effort is imparted to an output shaft 1 through a counter shaft 2 or an auxiliary shaft 4. The output shaft 1 of the first arrangement or unit comprises a gear 21 integral with it to drive the second arrangement, by direct coupling of an output gear 36, slidable axially on an output shaft 31, with the gear 21, transmitting then the four speeds of the first unit or arrangement or through driven gears and driving pinions of the gear pair 37, the driven pinion of the pair 38 and the sliding auxiliary pinion 39, each of them being mounted respectively on the input shaft 33, countershaft 32 and auxiliary shaft 34. The three shafts rotate freely on the ball bearings 35 have imparted thereto the four speeds of the first arrangement increased by the ratio of the second unit or arrangement i.e.

$$\frac{n^2}{n^1} = \frac{\text{driving pinion}}{\text{driven pinion}} = \text{decreasing ratio}$$

The assembly is contained in a housing with sides 12 which support all the shafts. Means are provided for shifting the sliding pinions 16 and 17, 36 and 39 and a permit choosing the selected speed.

Such means may be realized in a conventional manner (FIG. 8). Two concentric pinions 40 and 41 are moved through operating levers 42 and 43 and each moves a rack 44 and 45 integral with forks 46 and 47 engaged in the grooves of the sliding pinions 39 and 36 in one part and in pinions 17 and 16 in another part. It is possible to realize gear boxes with a very large range of speeds and a third step of four speeds with a ratio equal to the total ratio of the two other steps, with a number of speeds of $4 \times 4 \times 4 = 64$.

In the foregoing example (FIG. 1) there are provided spur pinions. But it is possible to employ the same gear box with helicoidal pinions as in FIG. 4. It is sufficient that the box has no axial shifting of the sliding pinions, the speeds being obtained, in this case, by coupling of the output pinions.

This type of gear box may be employed with tool-machines, vehicles, cranes, diesel-locomotives and the like.

It permits operating electrical motors with different speeds, variators of the Leonard type or of mechanical type.

What I claim is:

1. In a multi-spaced gear box, in combination, an input shaft, a plurality of similar pairs of gears on said input shaft and having a number $n^1$ of teeth and a different number $n^2$ of teeth, a first pair of said gears being keyed on the input shaft, the others being mounted rotatably and disposed after said first pair on said input shaft, a countershaft parallel with the input shaft, a plurality of pairs of gears on said countershaft similar to the pairs on the input shaft and freely rotatably mounted axially disposed on said countershaft, each gear having $n^2$ teeth of any one of the pairs of one of said shafts meshing in operation with a driven gear having $n^1$ teeth of one of the pairs mounted on the other shaft so that each pair on the input shaft and on the countershaft rotates with a speed different than the speed of the driving pair with a ratio $$\frac{n^2}{n^1}$$

equal to and corresponding to a ratio of a geometrical progression, all of the pairs of gears mounted on the countershaft rotating in operation in an opposite direction than the direction of rotation of the pairs mounted on the input shaft, an output shaft parallel with the countershaft, an output gear mounted for sliding axially on said output shaft and for rotation therewith and slidably positionable in operation in positions for meshing selectively with any given one of the driven gears having $n^1$ teeth of the pairs of gears mounted on the countershaft and rotating in the same direction as the input shaft, an auxiliary shaft parallel with the other shafts, a gear mounted freely rotating on said auxiliary shaft permanently meshing with the output gear and movable axially on said auxiliary shaft for meshing selectively with any one of the driven gears having $n^1$ teeth of the pairs of pinions mounted on the input shaft, the output shaft rotating in operation in the same direction as the input shaft, whereby in operation the output shaft has imparted thereto selectively and alternatively as many speeds as there are of said driven gears.

2. In a multi-speed gear box according to claim 1, including a unit comprising means operable selectively to multiply the number of output speeds of said output shaft, said unit comprising gears to receive the output of said output shaft and develop output speeds in gear ratios according to said ratio $$\frac{n^2}{n^1}$$

in a geometrical progression.

3. In a multi-speed gear box, in combination, an input shaft, a plurality of similar pairs of gears on said input shaft and having a number $n^1$ of teeth and a different number $n^2$ of teeth, a first pair of said gears being keyed on the input shaft, the others being mounted rotatably and disposed after said first pair on said input shaft, a countershaft parallel with the input shaft, a plurality of pairs of gears on said countershaft similar to the pairs on the input shaft and freely, rotatably mounted axially disposed on said countershaft, each gear having $n^2$ teeth of any one of the pairs of one of said shafts meshing in operation with a driven gear having $n^1$ teeth of one of the pairs mounted on the other shaft so that each pair on the input shaft and on the countershaft rotates with a speed different than the speed of the driving pair with a ratio $$\frac{n^2}{n^1}$$

equal to and corresponding to a ratio of a geometrical progression, all of the pairs of gears mounted on the countershaft rotating in operation in an opposite direction than the direction of rotation of the pairs mounted on the input shaft an auxiliary shaft parallel with the other shafts, a plurality of gears rotatably mounted on said auxiliary shaft and equal in number to said driven gears having $n^1$ teeth on said input shaft and disposed constantly meshing with said driven gears on said input shaft for rotation in opposite direction than said driven gears on said input shaft, an output shaft parallel with the countershaft, output gears equal in number to the gear having $n^1$ teeth on said input shaft mounted for sliding axially on said output shaft and for rotation relative thereto and slidingly positionable in operation in positions for meshing selectively with given ones of the driven gears having $n^1$ teeth of the pairs of gears mounted on the countershaft and said auxiliary shaft and rotating in the same direction as the input shaft, toothed coupling members operable selectively for coupling individually the output gears rotatably mounted on said output shaft with said output shaft selectively, and synchronizing means for reducing the relative speed between said output shaft and said output gears on said output shaft to protect the teeth of said coupling members.

4. In a multi-speed gear box according to claim 3, in which said shafts are arranged extending parallel in a configuration diamond-shaped in cross section, said input shaft and said output shaft being disposed diagonally from each other in said configuration, and including an output gear freely mounted on said output shaft for reverse operation of said input shaft and disposed meshing in operation with a gear having $n^2$ teeth mounted on said input shaft.

References Cited in the file of this patent

UNITED STATES PATENTS

| | | |
|---|---|---|
| 762,087 | Robion | July 7, 1904 |
| 1,328,062 | Stewart | Jan. 13, 1920 |
| 2,677,710 | Ruhland | Apr. 20, 1954 |
| 2,784,610 | Block | Mar. 12, 1957 |
| 2,932,988 | Flynn et al. | Apr. 19, 1960 |

FOREIGN PATENTS

| | | |
|---|---|---|
| 477,839 | Germany | June 14, 1929 |
| 680,405 | France | Apr. 29, 1930 |

OTHER REFERENCES

Product Engineering, December 26, 1960, pages 48–49.